United States Patent

[11] 3,581,060

| | | |
|---|---|---|
| [72] | Inventors | Karl Bauer;<br>Herbert Turk, Remscheid-Lennep, Germany |
| [21] | Appl. No. | 744,550 |
| [22] | Filed | July 12, 1968 |
| [45] | Patented | May 25, 1971 |
| [73] | Assignee | Barmag Barmer Maschinenfabrik<br>Aktiengesellschaft<br>Wuppertal, Germany |
| [32] | Priority | July 14, 1967, Aug. 14, 1967 |
| [33] | | Germany |
| [31] | | B93489 and B72212 |

[54] TEMPERATURE CONTROL DEVICE IN A HEATED GALETTE
8 Claims, 5 Drawing Figs.

[52] U.S. Cl. ................................................. 219/469
[51] Int. Cl. .................................................. H05b 1/02
[50] Field of Search ...................................... 219/469, 470, 471, 388

[56] References Cited
UNITED STATES PATENTS

| | | | |
|---|---|---|---|
| 3,105,133 | 9/1963 | Norton ....................... | 219/469 |
| 3,280,350 | 10/1966 | Burdge et al. ................. | 219/469 |
| 3,296,418 | 1/1967 | Johnson ...................... | 219/469 |
| 3,414,711 | 12/1968 | Guyet et al. .................. | 219/469 |
| 3,448,233 | 6/1969 | Landis ........................ | 219/469 |

*Primary Examiner*—Bernard A. Gilheany
*Assistant Examiner*—F. E. Bell
*Attorney*—Marzall, Johnston, Cook and Root

ABSTRACT: A rotatable galette for transporting threads, filaments, tapes and the like capable of being controllably heated, preferably by an internally and concentrically mounted stationary induction coil, in which the roller jacket of the galette is an outer cylindrical wall having on its inner surface a radially outwardly recessed portion adapted to receive the terminal heat-sensitive end of an elongated temperature measuring feeler gauge.

PATENTED MAY 25 1971 3,581,060
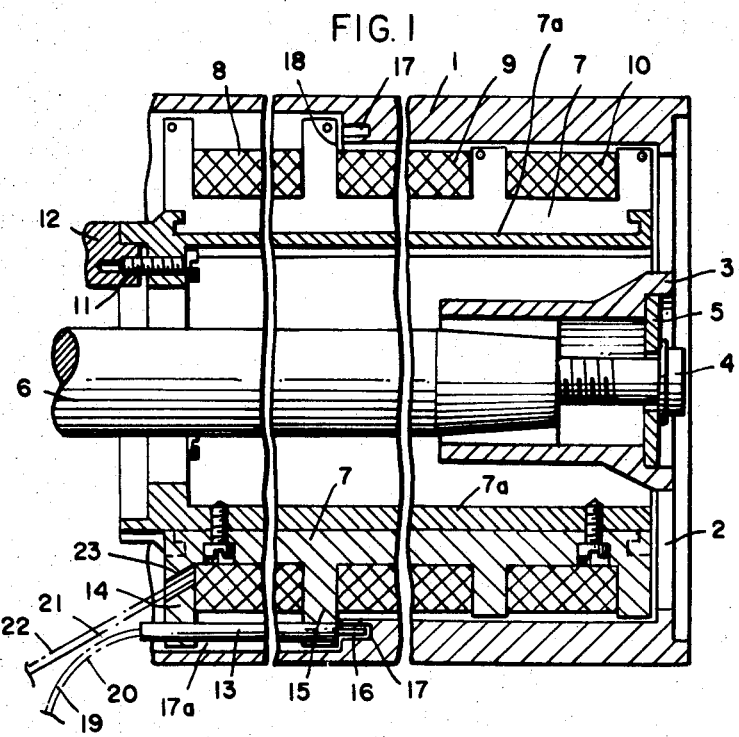
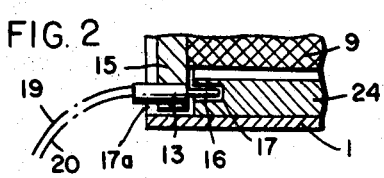
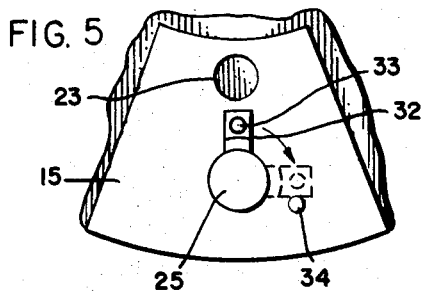
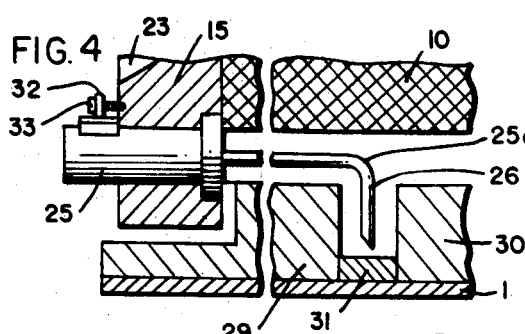
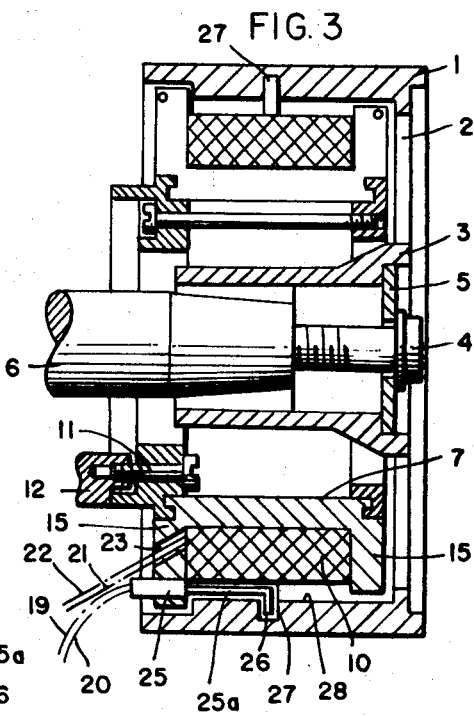
INVENTORS:
KARL BAUER
HERBERT TURK
BY: Marzall, Johnston, Cook & Root
ATT'YS

TEMPERATURE CONTROL DEVICE IN A HEATED GALETTE

This invention relates to heated galettes in the form of cylindrical rollers which are rotatably mounted on a drive shaft so as to extend axially outwardly from a supporting frame to receive one or more synthetic threads or the like to be conveyed in running contact with the outer circumferential surface of the galette. These galettes, rollers or godets are especially useful for heat-treating synthetic threads or filaments, e.g. in stretching or texturing devices, and may be combined with separate idly running guide rollers driven only by threads wound around them. The heated galettes must generally be maintained within narrow temperature limits along that portion of their outer surface which remains in running contact with the threads.

A heated galette of this type has been described in detail in copending application, Ser. No. 597,580, filed Nov. 29, 1966, wherein temperature control is achieved by means of a temperature gauge which is mounted at the inner end of the galette so that it enters an axially recessed annular groove of the cylindrical wall of the galette while remaining free of contact with this wall. This particular construction has proven to be useful in many applications with reasonably good results. However, in some cases and particularly when using axially longer rollers where the thread, tape or the like may be wound around the roller several times or contacted in several passes with the roller, the temperature measured only at the inner or back end of the galette does not serve as an effective means for controlling the temperature at those areas where the thread must be treated.

One object of the present invention is therefore to provide a controllably heated galette, preferably one which is internally heated by an induction coil, wherein a temperature measuring feeler gauge can be inserted in such a manner that its terminal heat sensitive end member can be located at a position which is approximately centrally located along the axis of the heated roller jacket of the galette and relatively close to the outer wall surface which is in running contact with the thread. Another object of the invention is to provide means for mounting the feeler gauge in such a manner that it can remain in place while assembling or removing the outer heatable roller jacket. These and other objects and advantages of the invention will become more apparent upon consideration of the following detailed disclosure.

It has now been found, in accordance with the present invention that considerably improved results are achieved in a controllably heated galette of the type described above if the roller jacket consists of an outer cylindrical wall which is radially outwardly recessed over a portion of its inner surface to provide a thin wall section thereof at a position centrally of its axis where thread contact is made and if means are provided to mount an elongated temperature feeler gauge, preferably one which has a hook-shaped or right-angled bend at its terminal end, onto the supporting frame such as the stationary base of the induction coil core used in the heating device, such that the elongated feeler gauge extends parallel to the axis of rotation of the roller jacket along its inner wall surface to terminate centrally thereof adjacent the thin wall section while remaining free of contact therewith. It is particularly desirable to provide a radial recess only at the approximately central position or at a point located at about the middle up to the outer end of the roller jacket inner wall surface, measured axially, such that the recess is just wide enough to accommodate the heat sensitive terminal end of the feeler gauge which is bent radially outwardly in order to be positioned in this recess. Also, this hook-shaped feeler gauge is preferably mounted with means to rotate its elongated supporting leg member and means to lock it in place so as to hold the terminal end member in the recessed portion. Also, while the recessed portion of the roller jacket inner wall can be simply turned out or machined, e.g. from its inner end up to the position centrally of its axis, it is especially advantageous to construct the roller jacket as an outer thin wall section of an inductively heatable metal combined with one or more annular inner wall sections composed of a material which has a good electrical conductivity.

Various embodiments of the invention are illustrated by means of the accompanying drawing in which:

FIG. 1 is a cross-sectional view, partially in schematic form, taken along the axis of rotation of a controllably heated galette;

FIG. 2 is a small segmental view of the cross section shown in FIG. 1, taken at the central position of the galette which carries the terminal end of a temperature feeler gauge;

FIG. 3 is a cross-sectional view, partially in schematic form, of another embodiment of a controllably heated gallette taken along its axis of rotation;

FIG. 4 is a small segmental view of that portion of FIG. 3 showing the elongated feeler gauge in rotatable locked position; and FIG. 5 is an end view of the rotatable feeler gauge as seen from the left in FIG. 4.

Referring first to FIGS. 1 and 2, the inductively heated galette has a roller jacket 1 firmly connected to the drive shaft 6 by means of radial spokes 2 attached to hub 3, this assembly being held in place by screw or bolt 4 and the centering disc 5. The induction coil carrier or core 7 with its induction coils 8, 9 and 10 is rigidly fastened by means of several screws 11 to a stationary frame 12, preferably over the inner core supporting member 7a. The elongated temperature measuring feeler gauge 13 is seated in a stationary position in the radial arms 14 and 15 of the coil carrier 7 so that its heat-sensitive terminal end 16 which serves as the temperature measuring point extends into an annular slot 17 turned into the offset face 18 of the cylindrical wall of the roller jacket as an extension of the radially recessed portion 17a. The electrical lead lines 19 and 20 as well as the lines 21 and 22 passing through opening 23 from the induction coil extend to a conventional heat regulator (not shown) which can be mounted externally of the galette at any suitable place on the machine housing or frame 12. It is also possible to install a second feeler gauge or several feeler gauges in the same manner in the recessed wall of the roller jacket. For example, with two feeler gauges, one can be used as a feedback to the heat regulator or temperature control device while the other can be employed as a feedback to a temperature indicating and/or recording instrument.

In FIG. 2, the roller jacket 1 is a relatively thin-walled cylindrical member composed of an inductively heatable metal at the forward end of which there is inserted the annular bushing or sleeve 24 composed of a material having good heat and electrical conductivity. The left ring-shaped rearwardly facing surface of the bushing 24 is provided with an annular groove or recess 17 in the same manner as the offset surface 18 of the wall in FIG. 1.

The electrically well conductive material can also be applied as a layer into the thin-walled roller jacket or by means of a building-up welding. In all cases, the terminal end 16 of the feeler gauge 13 extends into the annular groove 17 so that it is surrounded on three sides by the bushing material.

An especially preferred embodiment of the invention is shown in detail in FIGS. 3—5 and provides an especially accurate temperature control of a heated galette, especially one which is inductively heated, since the point at which the temperature is measured is in close proximity to the outer circumferential surface of the galette which is in contact with threads or the like being transported or treated thereon.

In this particular embodiment, the roller jacket 1 is again firmly connected to the drive shaft 6 over spokes 2 and hub 3 by means of the bolt 4 as well as disc 5. The coil core 7 with one or several coils 10, preferably consisting of radial laminations, is rigidly fastened to a centering portion 12 of a stationary supporting frame by means of several screws 11. The temperature measuring feeler gauge 25 is seated in this case rotatably as well as in a stationary position in one or several radial arms 15 of the core member 7, so that its terminal end 26 can be bent at a right angle and turned into a locked position where it enters a radially recessed groove or slot 27 on the inner surface 28 of the roller jacket wall. This slot 27 can be turned from a single metal wall of the roller jacket or else it can be formed out of one or several bushings 29, 30 and 31 fitting and lining a thin-walled outer wall 1 as shown in FIG. 4. Electrical lead lines 19, 20 and 21, 22 from the feeler gauge and the induction coil are connected to a heat regulator, or when using more than one feeler gauge, lines 19, 20 can be connected to a temperature indicator and/or recorder.

The manner in which the temperature measuring feeler gauge 25 is locked in place is shown in greater detail in FIGS. 4 and 5. The gauge 25 is rotatably seated in the core arm 15 with its elongated leg member 25a extending axially outwardly in the gap space between the induction coil and the roller jacket. The feeler gauge protrudes backwardly from the core arm 15 to provide a bracket 32 with a locking screw 33 which engages arm 15 and holds the gauge firmly in place. By releasing this locking screw, the gauge can be given a quarter turn as indicated by the arrow in FIG. 5 until bracket 32 engages stop pin 34, at which point screw 33 can be tightened. The bent end 26 of the gauge is then completely within the gap space between the induction coil 10 and bushings 29, 30 (FIG. 4), so that the roller jacket can be easily removed without catching on the feeler 26. This sequence is then reversed when reassembling the galette.

By employing a bushing or inner sleeve lining having good electrical conductivity, the construction of the roller jacket of the galette is simplified but more importantly it is possible to favorably influence the temperature distribution on the outer surface of the roller jacket as well as obtaining a higher performance with small magnetic flux in an inductively heated galette. Beyond these results, there is the special advantage of achieving a thermal feedback for temperature regulation by means of a stationary elongated temperature measuring feeler gauge which can be inserted at a point in close proximity to the roller jacket surface which actually carries the thread being treated, i.e. approximately in the center of the axial length of the roller jacket. The embodiment of FIGS. 3—6 has the further advantage that the terminal end of the feeler gauge can be positioned not only centrally of the roller length but can be further extended forward the outer end of the galette where it is often desirable to maintain a would thread at its highest temperature.

It is of course important that the feeler gauge as well as the inductive heating unit remain free of direct contact with the roller jacket, and this is best accomplished by fixing the radial position of the feeler gauge in a fixed or rotatable mounting in the radial arms of the induction core. If desired, the induction core may have several radial arms with independent coils therebetween which direct the magnetic flux in tow or more closed loops through the outer inductively heatable roller jacket or shell, and several feeler gauges can be inserted to separately control the temperature over each segment influenced by its associated induction coil.

The feeler gauge having a short terminal end bent at a right angle adapted to extend radially outwardly of the roller jacket and capable of being turned and locked into a radially recessed slot in the inner surface of the roller jacket has the advantage of providing a careful and accurate temperature control at the most critical or sensitive portion of the roller jacket while being relatively independent of the wall thickness of the roller jacket. Moreover, where a running thread must pass several times around the galette to finally leave the surface near the free or outer end thereof, the feeler gauge with a bent or hooked end can be readily positioned to accurately control the temperature at the point where the thread leaves the surface. This particular embodiment thus incorporates all of the advantages of a feeler gauge fixedly mounted with its terminal end parallel to the axis of rotation of the galette while adding several additional advantages achieved by its radially extending tip which is capable of being locked in place and which is also capable of being rotated to an annular free space for assembly and disassembly of the galette.

We claim:
1. In a thread conveying galette with a roller jacket adapted to be inductively heated and carried at its outer end by means connected to a central rotatable drive shaft mounted on a supporting frame and with means to controllably heat said roller jacket while remaining free of contact therewith including an inductive heating coil unit rigidly connected to said supporting frame and held concentrically within said roller jacket and a stationary temperature measuring feeler gauge arranged to control the amount of heat developed in said roller jacket, the improvement which comprises: a roller jacket composed of an outer cylindrical wall part which is radially outwardly recessed over at least a portion of the length of said jacket to provide a thin wall secton thereof at a location centrally of its axis where thread contact is made and (b) an inner cylindrical wall part which contains an annular slot adapted to receive only the heat-sensitive terminal end of an elongated temperature gauge in a position adjacent said centrally located thin wall section, and an elongated temperature measuring feeler gauge mounted on said frame to extend parallel to the axis of rotation of said roller jacket along its inner wall surface while remaining free of contact therewith, only the heat-sensitive terminal end of said gauge being arranged to project into said annular slot where it is surrounded on three sides by the walls of the slot the walls of the slot while remaining free of contact therewith.

2. A galette as claimed in claim 1 wherein said roller jacket consists of an integral inductively heatable cylindrical metal wall having said thin wall section turned out from its inner end up to said location centrally of its axis and having said annular slot axially recessed in the offset face of said inner cylindrical wall part where it joins said thin wall section.

3. A galette as claimed in claim 1 wherein said roller jacket consists of an outer inductively heatable cylindrical metal wall as said thin wall section extending over the length of the galette and an inner annular bushing composed of an electrically well conductive material as said inner wall part.

4. A galette as claimed in claim 1 wherein said roller jacket is radially outwardly recessed only at said central location of its axis of rotation to form said annular slot, and said temperature measuring feeler gauge has an elongated member extending parallel to the axis of rotation of said roller jacket along its inner surface and a terminal end member bent radially outwardly into said annular slot, with means to rotate said leg member about its longitudinal axis and locking means to hold said terminal end member in said recessed portion.

5. A galette as claimed in claim 4 wherein the radially outwardly recessed portion of said roller jacket is formed by at least one annular bushing of an electrically well conductive material lining the inner surface of an outer inductively heatable cylindrical metal wall.

6. A galette as claimed in claim 5 wherein said temperature measuring feeler gauge is rotatably and lockably mounted onto the stationary base of the core of said induction coil.

7. A galette as claimed in claim 5 wherein said temperature measuring feeler gauge has an elongated leg member extending through a plurality of radial supporting arms of the induction coil core and said radially recessed portion of said roller jacket is located in the center up to a point near the outer end of heated roller jacket as measured longitudinally of the roller axis outwardly from the supporting frame.

8. A galette as claimed in claim 1 wherein said outer cylindrical wall part is composed of an inductively heatable metal and is radially outwardly recessed to provide said thin wall section over its length from said supporting frame at least up to said central location, and said inner cylindrical wall part includes a plurality of annular bushings composed of an electrically well conductive material lining said thin wall section in abutting axial relationship, one of said bushings having a substantially smaller annular dimension and being positioned at said central location so as to form a radially projecting annular slot in said inner cylindrical wall part.